United States Patent [19]
Maguire

[11] Patent Number: 4,548,034
[45] Date of Patent: Oct. 22, 1985

[54] BYPASS GAS TURBINE AEROENGINES AND EXHAUST MIXERS THEREFOR

[75] Inventor: Addison C. Maguire, Derby, England

[73] Assignee: Rolls-Royce Limited, London, England

[21] Appl. No.: 598,153

[22] Filed: Apr. 9, 1984

[30] Foreign Application Priority Data

May 5, 1983 [GB] United Kingdom ................. 8312307

[51] Int. Cl.$^4$ ........................... F02K 1/38; F01N 1/14
[52] U.S. Cl. ....................................... 60/262; 60/264; 181/220
[58] Field of Search ......................... 60/262, 263, 264; 181/213, 220

[56] References Cited

U.S. PATENT DOCUMENTS

| | | | |
|---|---|---|---|
| 4,045,957 | 9/1977 | Di Sabato | 60/262 |
| 4,147,029 | 4/1979 | Sargisson | 60/262 |
| 4,302,934 | 12/1981 | Wynosky et al. | 60/262 |
| 4,401,269 | 8/1983 | Eiler | 60/262 |

FOREIGN PATENT DOCUMENTS

| | | | |
|---|---|---|---|
| 2082259 | 3/1982 | United Kingdom | 60/262 |
| 2104967 | 3/1983 | United Kingdom | 60/262 |

Primary Examiner—Carlton R. Croyle
Assistant Examiner—Timothy S. Thorpe
Attorney, Agent, or Firm—Cushman, Darby & Cushman

[57] ABSTRACT

A bypass gas turbine aeroengine has an exhaust mixer of the lobed type. The trailing edges of the confronting sides of each lobe are cut back to form notches or scallops in the sides of the lobe. To reduce aerodynamic losses and engine length and weight, the final turbine stage within the engine core is without outlet guide vanes so that the turbine exhaust gas stream issuing from the turbine has a substantial swirl component of velocity. Correction back to an axial direction of mean flow at the downstream end of the exhaust mixer nozzle is achieved by making the area of the scallop in one of the confronting sides of each lobe greater than the area of the scallop in the other side, the arrangement being such that sufficient of the turbine exhaust stream effuses from the larger scallops in directions contrary to the swirl component of velocity to produce the desired correction.

4 Claims, 9 Drawing Figures

BYPASS GAS TURBINE AEROENGINES AND EXHAUST MIXERS THEREFOR

The present invention relates to bypass gas turbine aeroengines (known as turbofans) having exhaust mixer nozzles whereby the turbine exhaust gas stream and the by-pass air stream are combined with each other before exit from a final propulsion nozzle.

A well known type of exhaust mixer nozzle proposed for use in such engines is the so-called "multi-lobed" mixer, which projects portions of the turbine exhaust stream and the bypass stream into each other and which also increases the area of contact between the two streams, thereby improving the propulsive efficiency of the turbofan by improving the efficiency of the mixing process.

Unfortunately, such multi-lobed mixer nozzles contribute extra length and weight to the engine, and there is therefore a special need to minimise engine length and weight if such a mixer is fitted.

The present invention provides a multi-lobed mixer nozzle which minimises engine length by enabling the engine to be designed without outlet guide vanes after the final turbine stage.

According to the present invention, a bypass gas turbine aeroengine has an exhaust mixer nozzle of the multi-lobed type for combining the turbine exhaust gas stream and the bypass air stream with each other before exit of the combined streams from a final propulsion nozzle, the aeroengine further including a final turbine stage comprising a stage of turbine rotor blades without outlet guide vanes such that the turbine exhaust gas stream issues from the final turbine stage with a substantial swirl component of velocity;

a turbine exhaust duct for conducting the turbine exhaust gas stream from the final turbine stage to the exhaust mixer nozzle, and an exhaust bullet which defines the inner boundary of the turbine exhaust duct;

wherein the lobes of the exhaust mixer nozzle are adapted to allow sufficient of the turbine exhaust stream to effuse therefrom in in directions contrary to said swirl component of velocity to produce in said turbine exhaust gas stream a mean flow direction which is substantially axial at the downstream end of the exhaust mixer nozzle.

The exhaust mixer nozzle performs the flow-turning function normally performed by outlet guide vanes in the prior art, thereby enabling the elimination of outlet guide vanes as such from the design, with consequent weight and performance benefits.

Accordingly, the turbine exhaust duct may advantageously be configured to act as a diffuser over all of the distance between the final stage of turbine blades and the exhaust mixer nozzle, thereby achieving a reduction in the length and weight of the aeroengine. Consequent on this, it is also advantageous to connect the exhaust bullet directly to the final turbine stage for rotation therewith.

Each lobe of the exhaust mixer nozzle is defined between confronting sides thereof, and in order to achieve de-swirling of the turbine exhaust gas stream at least one of these confronting sides on each lobe has a trailing edge which is cut back from the downstream end of the lobe so that the side has a notched appearance, the notch area of the side being sufficient to produce the substantially axial mean flow direction of the turbine exhaust gas stream at the downstream end of the lobe due to effusion of a portion of the turbine exhaust gas stream through the notch area. Preferably, both sides of each lobe are so notched, the notch area of one of the sides being greater than the notch area of the other side by an amount sufficient to produce the desired substantially axial mean flow direction.

In order to increase the aerodynamic efficiency of the exhaust mixer nozzle, it may be advisable to adapt the lobes of the exhaust mixer nozzle to receive the swirling turbine exhaust stream at the angle of swirl of the stream; this can be achieved if the upstream (forward) ends of the lobes are aligned with the direction of flow from the outlet of the turbine, the downstream (rear) ends of the lobes being aligned with the axial direction as previously.

Embodiments of the invention will now be described by way of example only with reference to the accompanying drawings, in which:

FIG. 3b shows the shapes seen in (but not beyond) section planes B—B and C—C of FIG. 3a;

FIG. 7b shows the shapes seen in (but not beyond) section planes B'—B' and C'—C' of FIG. 7a.

The drawings are not to scale.

Figure 1:
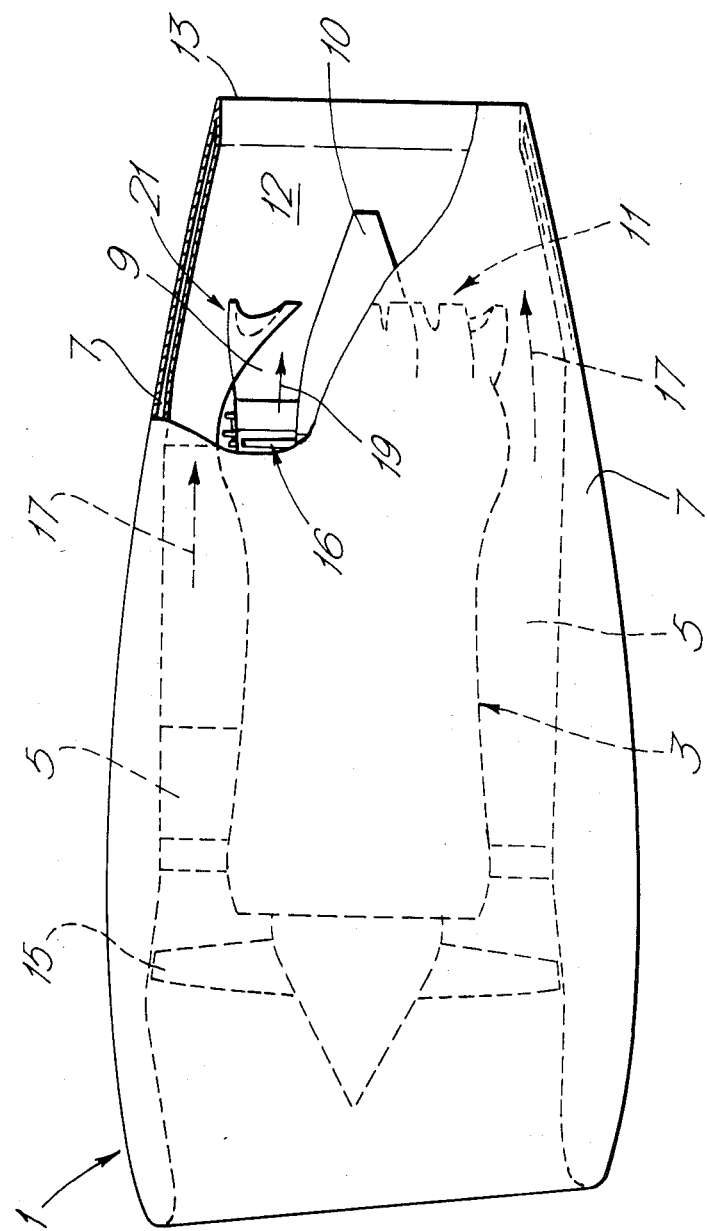
FIG. 1 shows a partly "broken-away" side elevation in diagrammatic form of a turbofan aeroengine fitted with a multi-lobed exhaust mixer in accordance with the invention.

Referring first to FIG. 1, a bypass gas turbine aeroengine or turbofan 1 is of high bypass ratio and includes: an engine core 3; a bypass duct 5 defined between the engine core 3 and the outer engine casing/nacelle 7; a turbine exhaust duct 9; an exhaust bullet 10; a multi-lobed exhaust mixer nozzle 11; an exhaust mixing duct 12 and a final propulsion nozzle 13. The bypass duct 5 is supplied with bypass air 17 from low pressure compressor or fan 15, which also supplies engine core 3, the fan 15 being driven from low pressure turbine 16 in core 3. Mixing of the bypass air stream 17 with the turbine exhaust stream 19 is facilitated by the mixer nozzle 11, which is attached to the rear of the engine core 3 and defines the ends of bypass duct 5 and turbine exhaust duct 9. Mixing of the two streams 17 and 19 continues in mixing duct 12 before exit of the combined stream to atmosphere through propulsion nozzle 13.

Figure 2:
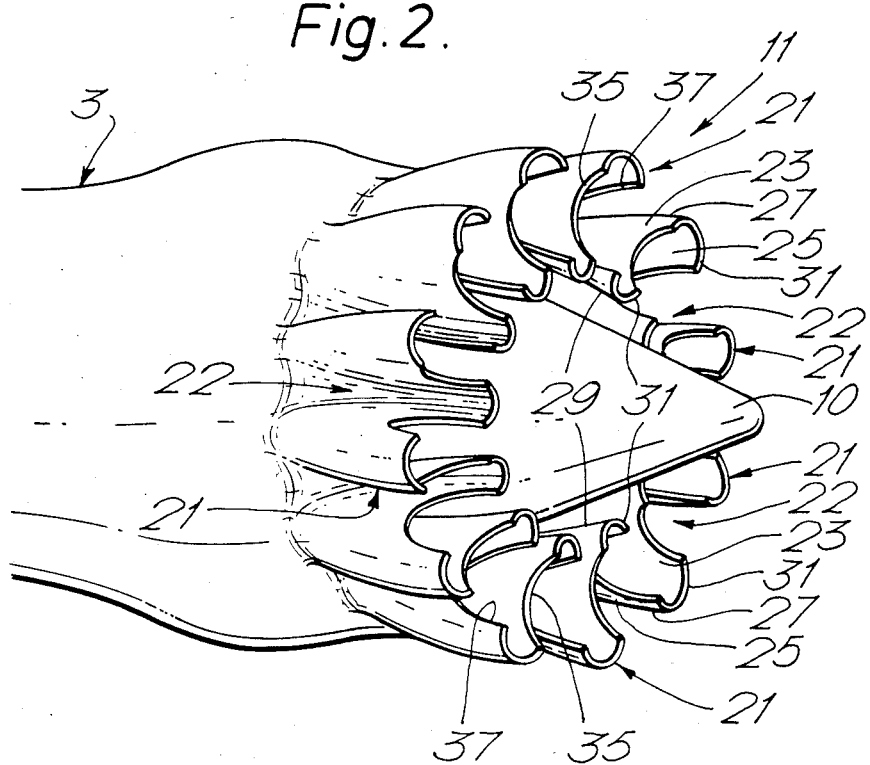
FIG. 2 shows a perspective view of the multi-lobed exhaust mixer of FIG. 1.

Referring to FIGS. 1 to 3 inclusive, the multi-lobed exhaust mixer nozzle 11 has twelve convex outward bulges or lobes 21 spaced from each other in an annular array around the nozzle, troughs 22 being defined between adjacent lobes. Lobed mixer nozzles are well known as a type and the structure and function of nozzle 11 will not be described in detail except where germane to the invention.

It will be noticed that each lobe 21 can be considered as being defined between a pair of mutually confronting side walls 23,25 joined at their radially outer extremities by "peak" portions 27 and at their radially inner extremities by "valley" portions 29. The side walls 23,25 are "cut-back" from the downstream ends 31 of the lobes 21 so that their trailing edges are notched, forming scallop shapes 35,37 respectively, which are concavely curved away from the plane occupied by the downstream end 31 of each lobe.

This scalloped appearance of the downstream ends of lobes 21 produces two effects in the present embodiment of our invention. The first effect, which is known from the prior art, e.g. U.S. Pat. No. 4,149,375, is to produce some more or less limited degree of mixing between portions of the turbine exhaust stream and the bypass air stream before the rest of the two streams meet at the most downstream extremity of the mixer nozzle; i.e. a progressive increase in inter-stream contact and degree of mixing is obtained in the downstream direction because the trailing edge scallops 35,37 provide a means whereby some of the turbine exhaust gases effuse from the sides of the lobes 21 into the bypass air stream portions flowing between the lobes 21 in troughs 22.

The second effect, which is not known from the prior art, is to ensure that more effusion of the turbine exhaust gases occurs from one side of each lobe than the other side, this being achieved by the fact that the notches or scallops 37 are bigger than scallops 35, i.e. scallops 37 extend further upstream along the sides of the lobes than do scallops 35 and are of greater areal extent.

The manner in which this novel feature minimises engine length and weight will now be described by comparison with the prior art.

Figure 3A:
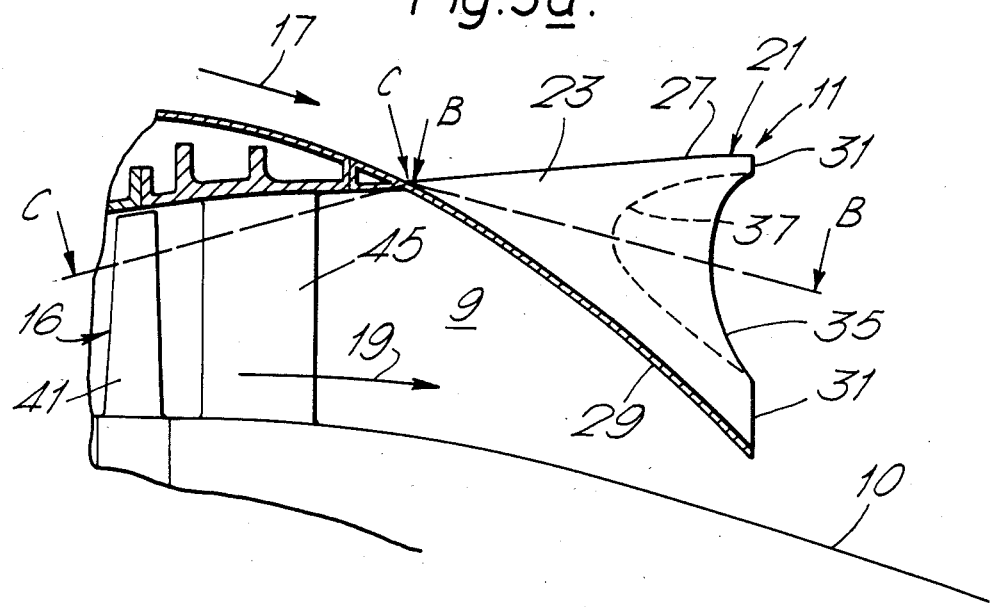
FIG. 3a is an enlargement of part of FIG. 1 illustrating the major features of the embodiment in part-sectional diagrammatic form.
Figure 3B:
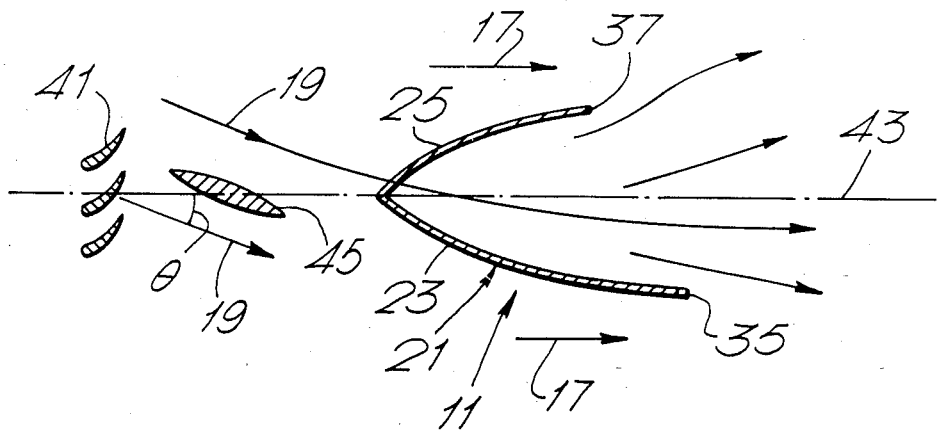
Figure 4:
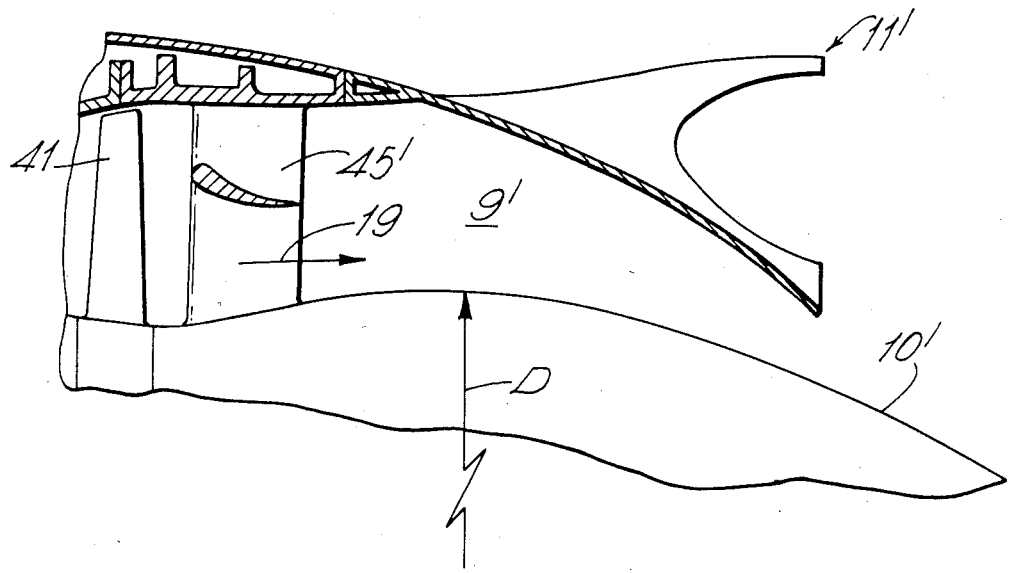
FIG. 4 is a view similar to FIG. 3a illustrating a known engine arrangement for purposes of comparison with the invention.

Referring to FIGS. 3a,3b and 4, the gases comprising the turbine exhaust stream 19 expand through the last stage of turbine rotor blades 41 (which are the same in both arrangements) and pass through the annular turbine exhaust duct 9 or 9' to mixer nozzle 11 or 11'. The turbine gases leave blades 41 at a angle $\theta$ to the axial direction in the engine, defined by reference to the axis of rotation 43 of the turbine.

The angle $\theta$ is termed the "angle of swirl" of the turbine gases and in the prior art (FIG. 4) it is removed by means of outlet guide vanes 45' which turn gases so that the velocity of the turbine exhaust stream downstream of the vanes 45' is axial. The appropriate vane shape and disposition for achieving such axial flow is indicated in FIG. 4 as the shaded aerofoil section drawn into vane 45'. In the invention as shown in FIGS. 3a and 3b, outlet guide vanes are replaced by streamlined struts 45 which do not turn the turbine gases but are aligned with the direction of flow from the outlet of the turbine, no work being done on the gases by them.

In FIG. 4 the portion of exhaust duct 9' occupied by the outlet guide vanes 45' is made contracting in order that the flow turning process should control the aerodynamic efficiency of the flow out of the turbine blades to avoid performance losses. This necessitates a large maximum diameter D for the exhaust bullet 10', which is then progressively reduced in the downstream direction in order to provide a flow passage for the turbine gases between the bullet 10' and the mixer 11' which overall is diffusing in character. In FIG. 3, on the other hand, diffusion of the turbine gases can start directly from the outlet of the turbine blades 41 because the mixer now controls the flow out of the turbine, no turning of the turbine gases by the struts 45 being required. Hence, the total axial length of the turbine exhaust duct 9 between the outlet of the turbine blades 41 and the downstream end of the mixer is reduced compared to the prior art, enabling a shorter engine to be designed and reducing weight and drag.

Referring specifically to FIG. 3b, the swirling turbine gases forming turbine exhaust stream 19 are straightened by the mixer 11 to produce, at the exit from the mixer, a mean flow direction which is axial. Straightening occurs due to a combination of two factors, namely the initial laterally restricting and turning effect of the side-walls 23 and 25 of the lobes 21, and the effusion of large portions of the stream 19 from the lobes 21 through the large scallops 37 in side walls 25, as indicated by arrows, the effusion through scallops 37 being in directions generally contrary to the swirl velocity and in greater amounts than that through scallops 35.

It should of course be recognised that notches of various shapes and sizes other than the scallops shown in the present drawings could be utilised in the invention, such variation being in accordance with the desired magnitude of the turning effect on the turbine exhaust stream 19 and the amount of mixing between the turbine exhaust stream 19 and bypass stream 17 which it is desired to encourage upstream of the downstream end of the mixer. Referring again to FIGS. 2 and 3, one possible variation would be to have sides 23 of lobes 21 unscalloped, i.e. with their trailing edges occupying a common plane, sides 25 being scalloped to a slightly smaller extent than shown in order to balance the loss in effusion from sides 23.

Figure 5:
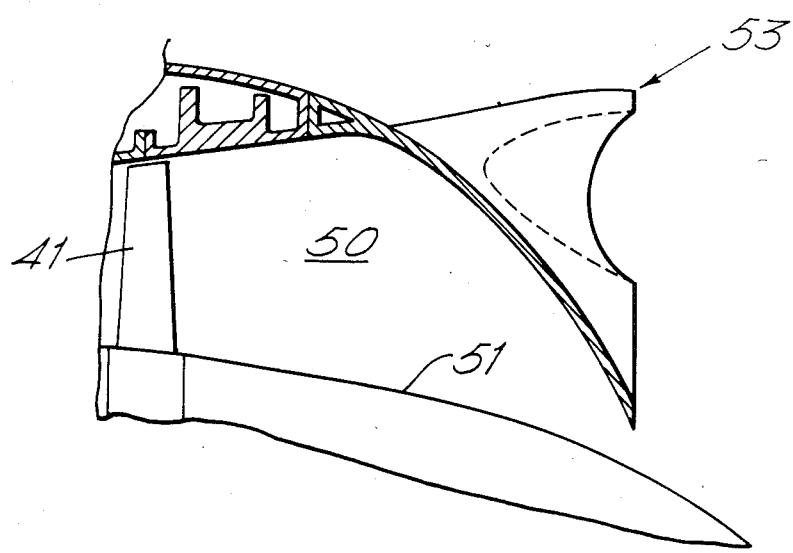
FIG. 5 is a further view similar to FIG. 3a illustrating an alternative embodiment of the invention.

The flow turning function performed on the turbine exhaust stream by mixers according to the present invention makes turbine outlet guide vanes as such unnecessary, as already noted. In FIG. 4, guide vanes 45', besides de-swirling the flow out of the turbine also act as structure for supporting the rear bearing housing of the turbine (the bearing housing and turbine shaft are not shown, but are within the upstream end of exhaust bullet 10'). In FIG. 3, guide vanes as such have been eliminated, but it has been necessary to retain bearing support structure in the form of the streamlined struts 45. In FIG. 5, there is shown a further embodiment of the invention in which the turbine shaft (not shown) does not have a rear bearing, but instead is cantilevered from another more forwardly located bearing (not shown) supported by structure elsewhere in the engine. Hence, no support struts are needed, aerodynamic drag and pressure losses associated with the struts are eliminated, and the outlet from the turbine blades 41 flows directly into a short diffusing exhaust duct 50 defined between the exhaust bullet 51 and the outer boundary wall of the turbine exhaust passage, which includes the mixer 53. In this arrangement the exhaust bullet 51 is of course a spinner, being supported from the rear of the low pressure turbine wheel, and both the exhaust bullet and the mixer can be made shorter than in FIG. 3 because without the blockage caused by struts 45, the upstream portions of duct 50 can be made more diffusing than corresponding portion of duct 9 in FIG. 3.

The layout shown in FIG. 5 reduces aerodynamic losses and length of the engine relative to that in FIG. 3, thereby decreasing specific fuel consumption and engine weight, the swirling turbine exhaust stream being straightened and controlled by the side-walls of the lobes and the unequal scallops in the sides of the lobes, as in FIGS. 1 to 3.

Figure 6:
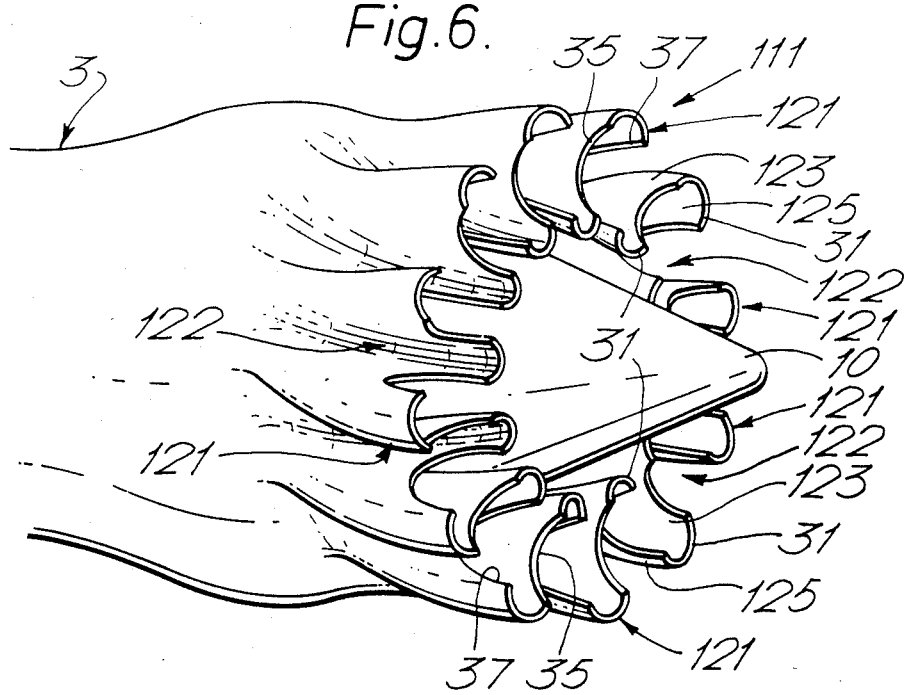
FIG. 6 is a perspective view similar to FIG. 2 but illustrating a further embodiment of the invention.
Figure 7A:
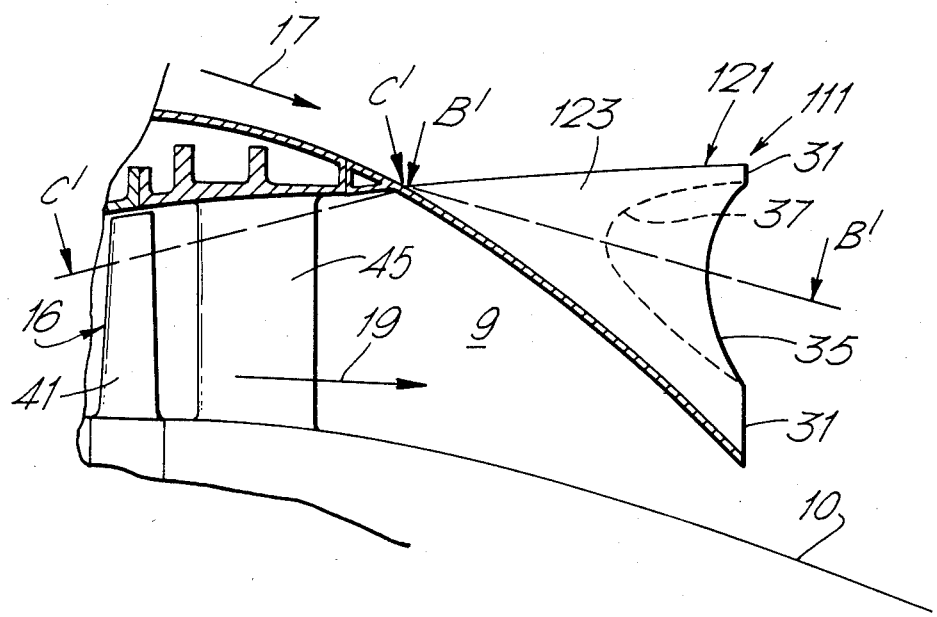
FIG. 7a is a view similar to FIG. 3a illustrating the major features of the embodiment of FIG. 6.
Figure 7B:
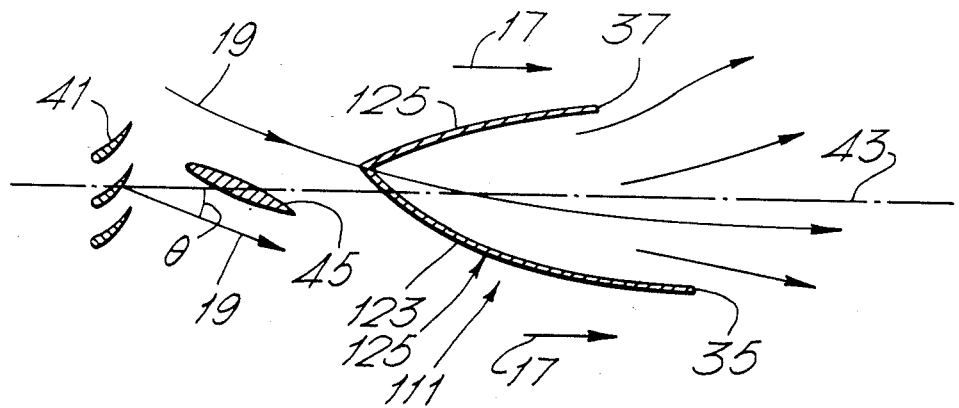

Turning now to FIGS. 6, 7a and 7b we see a further embodiment according to the present invention. Most features of this mixer nozzle 111 and the associated engine components are the same as for FIGS. 2, 3a and 3b, so features common to both embodiments are given the same reference numerals and will not be further described with reference to FIGS. 6 and 7.

It will be seen from a comparison of FIGS. 2 and 6 that the essential difference between the two embodiments is that in FIG. 6 the lobes 121 are not axially oriented throughout their longitudinal extent as in FIG. 2, but their centrelines are skewed somewhat in a clockwise direction at their upstream ends so that their upstream ends are aligned with the direction of flow from the outlet of the turbine 41, the downstream ends of the lobes 121 being aligned as before with the axial direction defined by reference to axis of engine rotation 43. Thus, as will be seen clearly in FIG. 7b, the lobes receive the swirling turbine exhaust stream 19 at the angle of swirl $\theta$ of the stream. The alignment of the side-walls 123 and 125 is therefore more compatible with the direction of flow from the turbine outlet than that of the sidewalls 23, 25 of the FIG. 3 embodiment, and it may therefore be expected that the side walls 123 and 125 of lobes 121 will exert less of a blocking effect on the turbine exhaust stream 19 and contribute to increased aerodynamic efficiency of the mixer nozzle.

Against the forgoing consideration must be balanced the fact that by virtue of the upstream alignment of the lobes 121, the troughs 122 between the lobes will be misaligned with respect to the bypass air stream 17. Consequently, a trade-off between gain in efficiency in the turbine stream 19 and loss in efficiency in the bypass stream 17 is to be expected for this embodiment unless the bypass stream 17 is given, or allowed to retain, a swirl component of velocity after passing through the fan 15 (FIG. 1).

In FIGS. 6 and 7, straightening of the turbine gas flow occurs in the same ways as for FIGS. 2 and 3, but the turning effect of the side walls 123 and 125 is more gradual.

The invention is applicable not only to the type of lobed mixers described above, in which—apart from the scallops—the lobes are of conventional form and shape, but also to more unusually shaped lobed mixers, such as described in our copending British patent application Nos. 8026686, 8126750, 8213147, and 8232469, among others.

I claim:

1. A bypass gas turbine aeroengine having an exhaust mixer nozzle of the multi-lobed type for combining the turbine exhaust gas stream and the bypass air stream with each other before exit of the combined streams from a final propulsion nozzle, the aeroengine further including:

a final turbine stage comprising a stage of turbine rotor blades without outlet guide vanes such that the turbine exhaust gas stream issues from the final turbine stage with a substantial swirl component of velocity;

a turbine exhaust duct for conducting said turbine exhaust gas stream from said final turbine stage to said exhaust mixer nozzle, said turbine exhaust duct being a diffuser over all the distance between said final stage of turbine blades and said exhaust mixer nozzle, and;

an exhaust bullet which defines the inner boundary of the turbine exhaust duct;

said lobes of said exhaust mixer nozzle having axially rearmost extremities which together define a downstream end of said exhaust mixer nozzle, each of said lobes comprising a pair of mutually confronting side walls wherein, to counter said swirl component of velocity in said turbine exhaust stream, one of said side walls of each of said lobes is configured to allow portions of said turbine exhaust gas stream to effuse therefrom in directions generally contrary to said swirl component of velocity to thereby produce in said turbine exhaust gas stream a mean flow direction which is substantially axial at said downstream end of said exhaust mixer nozzle, said one of said side walls of each of said lobes having a downstream edge which is cut back from said downstream end of said exhaust mixer nozzle, said downstream edge thereby defining a notch or scallop shape having a wide end thereof at said downstream end of said nozzle and a narrow end thereof a substantial distance upstream of said wide end, said effusion of said turbine exhaust stream in said direction generally contrary to said swirl component of velocity occurring through said notch or scallop shape.

2. A bypass gas turbine aeroengine according to claim 1 comprising means for producing a substantially axial mean flow direction of the turbine exhaust stream at the downstream end of the lobes, said means including both sides of each lobe having a notched area, the notched area of one of sides being greater than the notched area of the other one of said sides.

3. A bypass gas turbine aeroengine according to claim 1 in which the exhaust bullet is connected to the final turbine stage for rotation therewith.

4. A bypass gas turbine aeroengine according to claim 1 in which the upstream ends of the lobes of the exhaust mixer nozzle are aligned with the direction of turbine gas flow from the outlet of the turbine so as to receive the swirling turbine exhaust stream at the angle of swirl of the stream, the downstream ends of the lobes being aligned with the axial direction.

* * * * *